(12) United States Patent  (10) Patent No.: US 8,218,892 B2
Bober  (45) Date of Patent: Jul. 10, 2012

(54) VISUAL OBJECT DETECTION

(75) Inventor: Miroslaw Bober, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 927 days.

(21) Appl. No.: 10/980,789

(22) Filed: Nov. 4, 2004

(65) Prior Publication Data

US 2005/0152603 A1  Jul. 14, 2005

(30) Foreign Application Priority Data

Nov. 7, 2003 (EP) .................................... 03257063

(51) Int. Cl.
*G06K 9/40* (2006.01)

(52) U.S. Cl. ....................................................... 382/266

(58) Field of Classification Search .................. 382/263, 382/266–269, 115–118, 124–127
See application file for complete search history.

(56) References Cited

U.S. PATENT DOCUMENTS

| | | | | |
|---|---|---|---|---|
| 5,751,852 | A * | 5/1998 | Marimont et al. | 382/180 |
| 6,185,314 | B1 * | 2/2001 | Crabtree et al. | 382/103 |
| 6,535,632 | B1 | 3/2003 | Park et al. | |
| 6,731,788 | B1 * | 5/2004 | Agnihotri et al. | 382/157 |
| 6,754,667 | B2 * | 6/2004 | Kim et al. | 707/102 |
| 7,158,664 | B2 * | 1/2007 | Nagaoka et al. | 382/154 |
| 7,212,670 | B1 * | 5/2007 | Rousselle et al. | 382/173 |
| 2001/0051004 | A1 * | 12/2001 | Wang | 382/206 |
| 2002/0010704 | A1 * | 1/2002 | Kim et al. | 707/102 |
| 2002/0164082 | A1 * | 11/2002 | Sumitomo et al. | 382/254 |
| 2003/0086614 | A1 | 5/2003 | Shen et al. | |
| 2004/0101169 | A1 * | 5/2004 | Tisse et al. | 382/117 |
| 2005/0060308 | A1 * | 3/2005 | Naphade et al. | 707/5 |
| 2007/0291994 | A1 * | 12/2007 | Kelle et al. | 382/110 |

FOREIGN PATENT DOCUMENTS

EP  1 107 136 A1  6/2001

OTHER PUBLICATIONS

Khotanzad, Invariant Image Recognition by Zernike Moments, May 1990, IEEE Transaction on Pattern Analysis and Machine Intelligence, vol. 12, No. 5, pp. 489-497.*
Ye Bin, Invariance analysis of improved Zernike moments, Sep. 20, 2002, Institute of Physics Publishing.*
Kim, Region-based Shape Descriptor Invariant to Rotation, Scale and Translation, 2000, Elsevier Science.*
"Digital Image Processing" by W.K. Pratt, J. Wiley & Sons, 1978, NY, pp. 526-567.
IEEE Trans. Computing, 1972, vol. 21, No. 2, pp. 179-186, "A Class of Algorithms for Fast Digital Image Registration," Barnea et al.
IRE Trans. on Information Theory, 1962, vol. 8, pp. 179-187, "Visual Pattern Recognition by Moment Invariants," M. K. Hu.
J. Opt. Soc. Am., 1980, vol. 70, No. 8, pp. 920-930, "Image Analysis via the General Theory of Moments," M. R. Teague.

(Continued)

*Primary Examiner* — Alex Liew
(74) *Attorney, Agent, or Firm* — Birch, Stewart, Kolasch & Birch, LLP

(57) ABSTRACT

A method of representing an image comprises processing the image to produce a second image highlighting edges in the image (eg a intensity gradient image) and deriving a descriptor based on spatially integrated or rotationally invariant representations of regions of the second image.

18 Claims, 7 Drawing Sheets

OTHER PUBLICATIONS

IEEE Trans. PAMI, 1984, vol. 6, No. 6, pp. 698-706, "Recognitive Aspects of Moment Invariants," Abu-Mostafa et al.

Applied Optics, 1984, vol. 23, No. 6, pp. 812-816, "Phase-Only Matched Filtering," Horner et al.

IEEE Trans. PAMI, 1987, vol. 9, No. 5, pp. 700-703, "Registration of Translated and Rotated Images Using Finite Fourier Transforms," De Castro et al.

J. Opt. Soc. Am., 1986, vol. 3, No. 6, pp. 771-776, "Experiments on pattern recognition using invariant Fourier-Mellin descriptors," Sheng et al.

Introduction to MPEG-7, pub. J. Wiley, 2002, pp. 238-240, "Region-Based Shape Descriptor".

IEEE, 2000, pp. 258-261, "Haruspex: an image database system for query-by-examples," Lumini et al.

IEEE Transactions on Circuits and Systems for Video Technology, vol. 11, No. 6, Jun. 2001, pp. 716-719, "MPEG-7 Visual Shape Descriptors," Miroslaw Bober.

Pattern Recognition, May 1993, No. 5, "Improved Moment Invariants for Shape Disrimination," Chaur-Chin Chen.

Flusser et al; "A Moment-Based approach to Registration of Images with Affine Geometric Distortion" 8110 IEEE Transactions on Geoscience and Remote Sensing, vol. 32, No. 2, Mar. (1994), pp. 382-387, New York, US.

* cited by examiner (a)

(b)

(a)

(b)

VISUAL OBJECT DETECTION

This invention concerns a method for detection and localisation of objects (structures) in two-dimensional images. Practical applications include remote sensing, multi-object identification and medical imaging.

Cross-correlation, also known as template matching, is a technique commonly used for image matching (W. K. Pratt, Digital Image Processing. John Wiley and Sons 1978, New York, pp. 526-566 and D. Barnea and H. Silverman, "A class of algorithms for fast image registration", *IEEE Trans. Computing.*, vol 21, no. 2, pp. 179-186, 1972). However, it has a number of disadvantages, including broad and poorly defined (i.e. not prominent) maxima, sensitivity to noise, and lack of robustness to even minor geometric distortions in the image or pattern that is matched. Furthermore, it is computationally a very costly technique, especially if a change of scale a rotation of the pattern or image are allowed in addition to translations.

Another group of image matching techniques are based on geometric moments or moment invariants (M. K. Hu—"Visual pattern recognition by moment invariants", *IRE Trans. Information Theory*, vol. 8, pp. 179-187, 1962; M. R. Teague, "Image analysis via the general theory of moments", J. Opt. Soc. Am., vol. 70, no. 8, pp. 920-930, 1980 and Y. S Abu-Mostafa and D. Psaltis, "Recognition aspects of moment invariants", *IEEE Trans. PAMI*, vol. 6, no. 6, pp. 698-706, 1984). Most approaches convert grey-level or colour images into binarised grey level images before using moment-based techniques for matching. Usually, only lower-order moments are used. However, as (Y. S Abu-Mostafa and D. Psaltis, "Recognition aspects of moment invariants", *IEEE Trans. PAMI*, vol. 6, no. 6, pp. 698-706, 1984) notes, matching images based on moment invariants has rather low discriminating power.

Yet another possible approach is to use phase information of the Fourier transform. Such approaches include phase-only matched filters (J. L. Homer and P. D. Gianino, "Phase only matched filtering", Applied Optics, vol. 23, no. 6, pp. 812-816, 1984 and E. D. Castro and C. Morandi—"Registration of translated and rotated images using finite Fourier Transforms", *IEEE Trans. PAMI*, vol. 9, no. 5, pp. 700-703, 1987). The problem here is that the spectral phase of an image is not invariant to rotation and scaling. To solve this problem, an application of the Fourier-Mellin Transform (FMI), which is invariant to translation and represents rotation and scaling as translations in the parameter space, has been proposed (Y. Sheng and H. H. Arsenault, "Experiments on pattern recognition using invariant Furier-Mellin descriptors", J. Opt. Soc. Am., vol. 3, no. 6, pp. 771-776, 1986). Unfortunately, correlation-based matching of FMI descriptors also produces poorly defined maxima.

Most of the techniques mentioned above suffer from yet another significant problem—to work well they require that the visual object or region of interest is segmented from the "background". Segmentation is a very complex problem to which no satisfactory generic, reliable and robust solution exists.

The invention proposes a novel approach to visual object detection and localisation that has high discriminating power and requires no prior segmentation. The detection process is very fast, typically 2 to 5 orders of magnitude faster then standard correlation-based approaches, and gives reliable results even in noisy images.

Aspects of the invention are set out in the accompanying claims.

One aspect of the invention provides a method of representing an image comprising processing the image to produce a second image highlighting edges in the image (eg a intensity gradient image) and deriving a descriptor based on spatially integrated or rotationally invariant representations of regions of the second image. Other aspects of the invention include the resulting descriptor, various uses of the resulting descriptor, including searching and matching methods, and apparatus for executing said methods and for deriving and/or using the descriptors or representations. It is to be noted that use of a descriptor includes storage or other passive use as well as active use.

Embodiments of the invention will be described with reference to the accompanying drawings of which:

Figure 1:
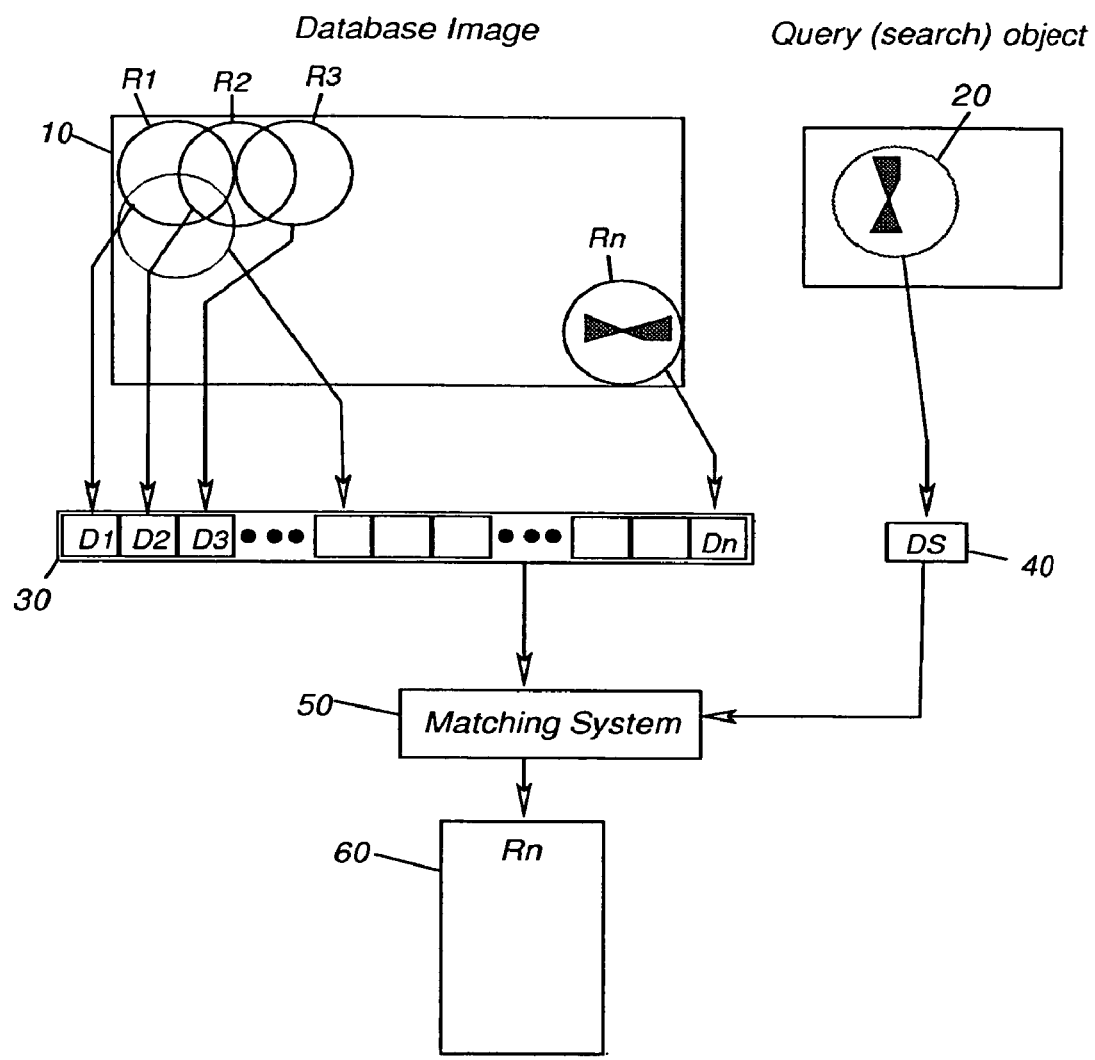
FIG. 1 is a schematic diagram of an embodiment of the invention.

Embodiments of the invention involve an image descriptor that supports fast search for visual objects without any segmentation. FIG. 1 shows the steps and processes involved in visual search/recognition of objects from a single example. Firstly, novel descriptors D1,D2, . . . ,Dn are extracted, possibly off-line, from regions R1,R2, . . . ,Rn of pre-defined, preferably circular, shape in the original image 10. The component descriptors are combined into the image descriptor 30 and stored in a database, together with links indicating the corresponding regions from which they were extracted. When a search for a visual object is conducted, the user simply shows an example object 20 in the original image or some other image. This can be done, for example, by specifying a circle around the object of interest. The descriptor 40 is then extracted from the example region and matched (compared) by the Matching System 50 to descriptors extracted off-line from all images in the database and stored in the descriptor database. Regions for which this matching process indicates high similarity between descriptors are likely to contain similar visual objects and are made available to the user in a suitable format, e.g. shown on a display 60.

One aspect of the embodiment is a novel design of the descriptors. The descriptors proposed in this invention are designed so that image segmentation into the object and background regions is not necessary. This is important, because if such prior segmentation is required, the descriptors cannot be extracted without knowledge of the search target. This means that the descriptor extraction cannot be performed off-line, as usually the target object is not known a priori and it is impossible or impracticable to segment the image into all possible "objects" of interest. Performing segmentation and extraction of descriptors on-line on the entire database is usually not practicable due to constraints on the processing power available, especially when large image databases are concerned.

When descriptors disclosed in the presented embodiment are employed, there is no need for object/background segmentation and search can be executed very quickly based on the descriptors extracted off-line. Furthermore, the search results are better, as they do not depend on the often poor quality of the segmentation process.

Figure 2:
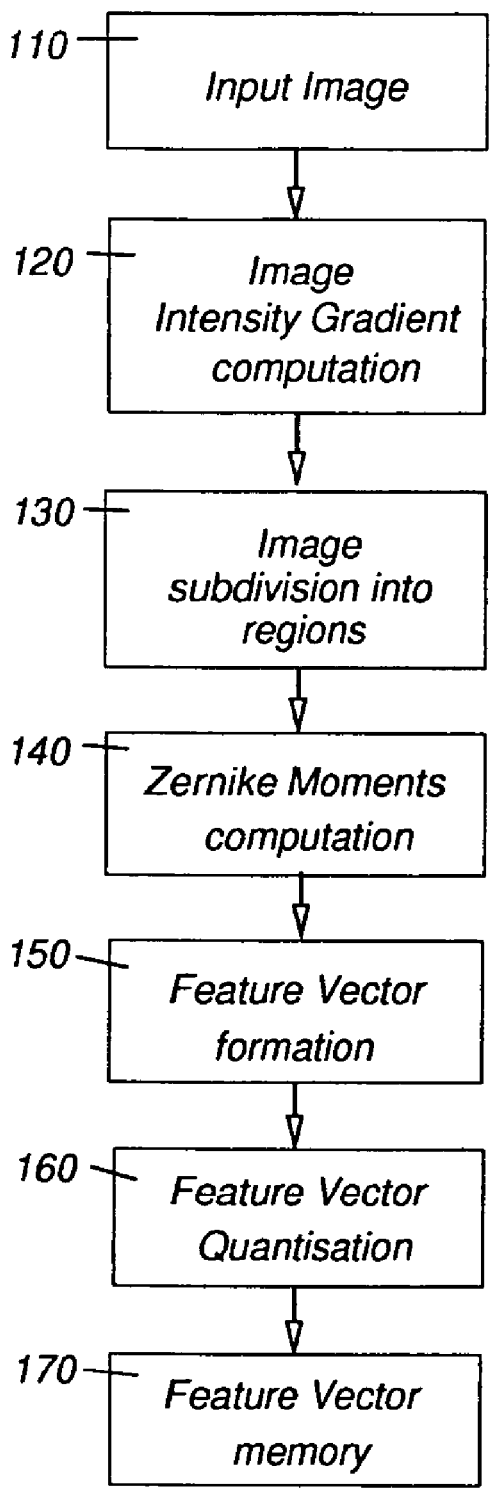
FIG. 2 is a flow diagram of an embodiment of the invention.
Figure 3:
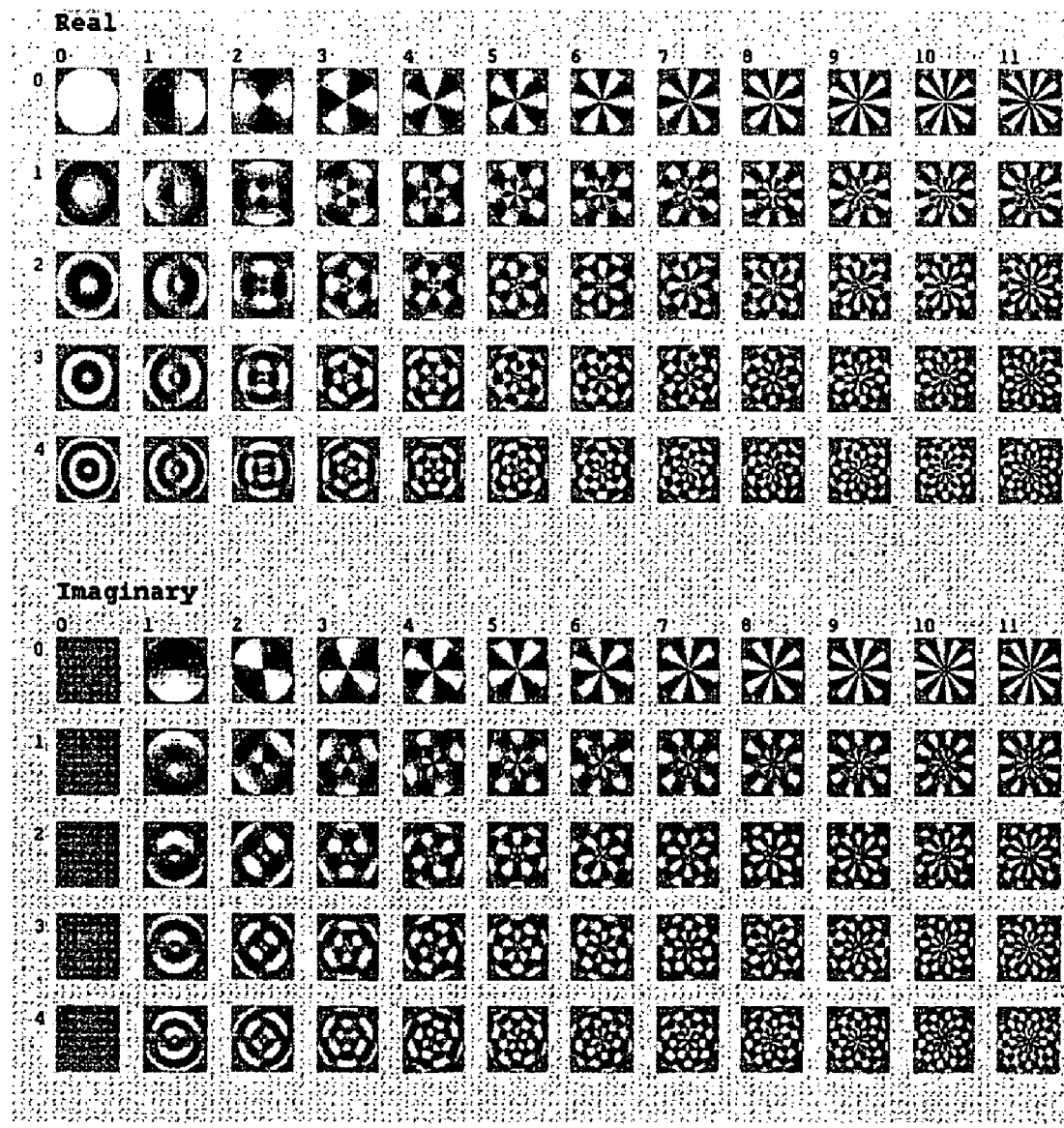
FIG. 3 is a diagram depicting convolution masks for ART components.

The descriptor extraction process is presented on FIG. 2. The input image 110 is directed to the module 120, which computes the intensity gradient at each pixel location. Methods of calculating the intensity gradient can be found in the textbooks and papers in the art, for example, on the internet. The resulting image will be referred to as the "gradient image". The gradient image is then subdivided into regions, preferably overlapping, in module 130. The size of the regions used should correspond broadly with the size of the objects of interest. This can be set, for example, by an indexer viewing the image, and observing objects in the image. Alternatively, for example, a region could be set to have an area that is a predetermined proportion of the total image. Regions may be of different sizes. Other ways of selecting regions of the image can be used. The regions may be unrelated to context (eg. objects in the image). Moment descriptors are calculated on the intensity gradient image for each region by module 140. The preferable moments are Zernike moments (see, for example, M. K. Hu—"Visual pattern recognition by moment invariants", *IRE Trans. Information Theory*, vol. 8, pp. 179-187, 1962) or the ART moments (see, for example,—Introduction to MPEG-7, pub. J. Wiley, 2002), but other types of moments can also be applied. Module 150 selects certain moments (features) from all moments calculated and combines them to form the feature vector. For example, for the ART moments, a combination of 12 angular and 5 radial components gives good results. FIG. 3 shows convolution masks for the 60 Real and Imaginary ART components. The feature vector is quantised in module 170, to reduce to storage capacity required and subsequently saved on the disk or in the system memory. Uniform quantisation to 6 or 5 bits per component gives good results for typical optical images with 8 bit per pixel resolution, but different ranges can be used as appropriate to the situation under consideration. The distance (or dissimilarity) between two regions described by the corresponding descriptors can be computed, for example, by using an L1 or L2 norm on the difference between feature vectors.

It is known how to extract moment-based descriptors from binary images (such as segmented images of objects) in order to perform a search for objects of interest. However, this embodiment proposes to use the intensity gradient image, or the edge strength image as the object descriptors. The edge image is likely to contain object external boundaries and also object-internal features, and furthermore, it is not sensitive to object and background intensities.

Figure 4:
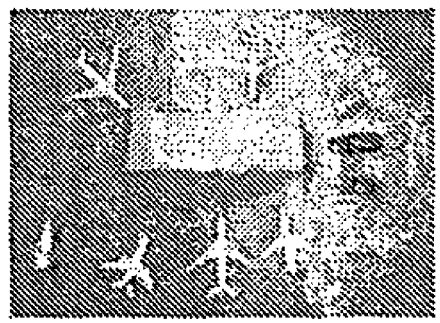
FIGS. 4a and 4b are an image and its intensity gradient image.
Figure 4:
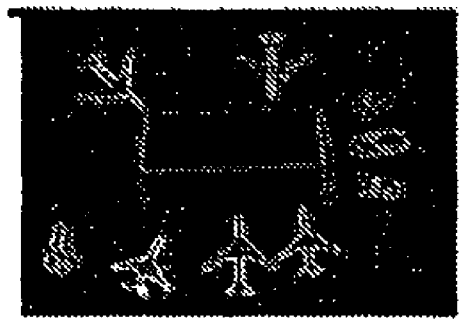
Figure 5:
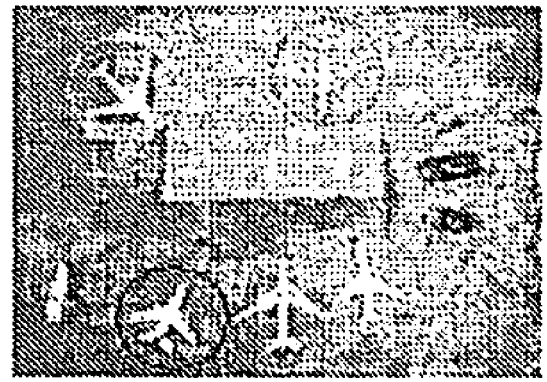
FIGS. 5a and 5b are images of objects detected in the image of FIG. 4.
Figure 5:
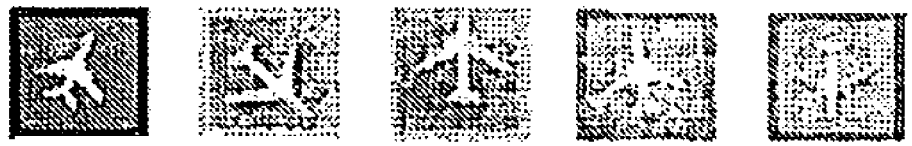

FIG. 4(*a*) shows an example image and its intensity gradient map (b). FIG. 5(*a*) shows objects recognised in the image, after the plane from the left was given as an example object for search. FIG. 5(*b*) shows the objects detected, ranked from left to right, based on the measure of similarity.

The invention can also be applied to multi-spectral images, for example, by following two different approaches described below.

Figure 6:
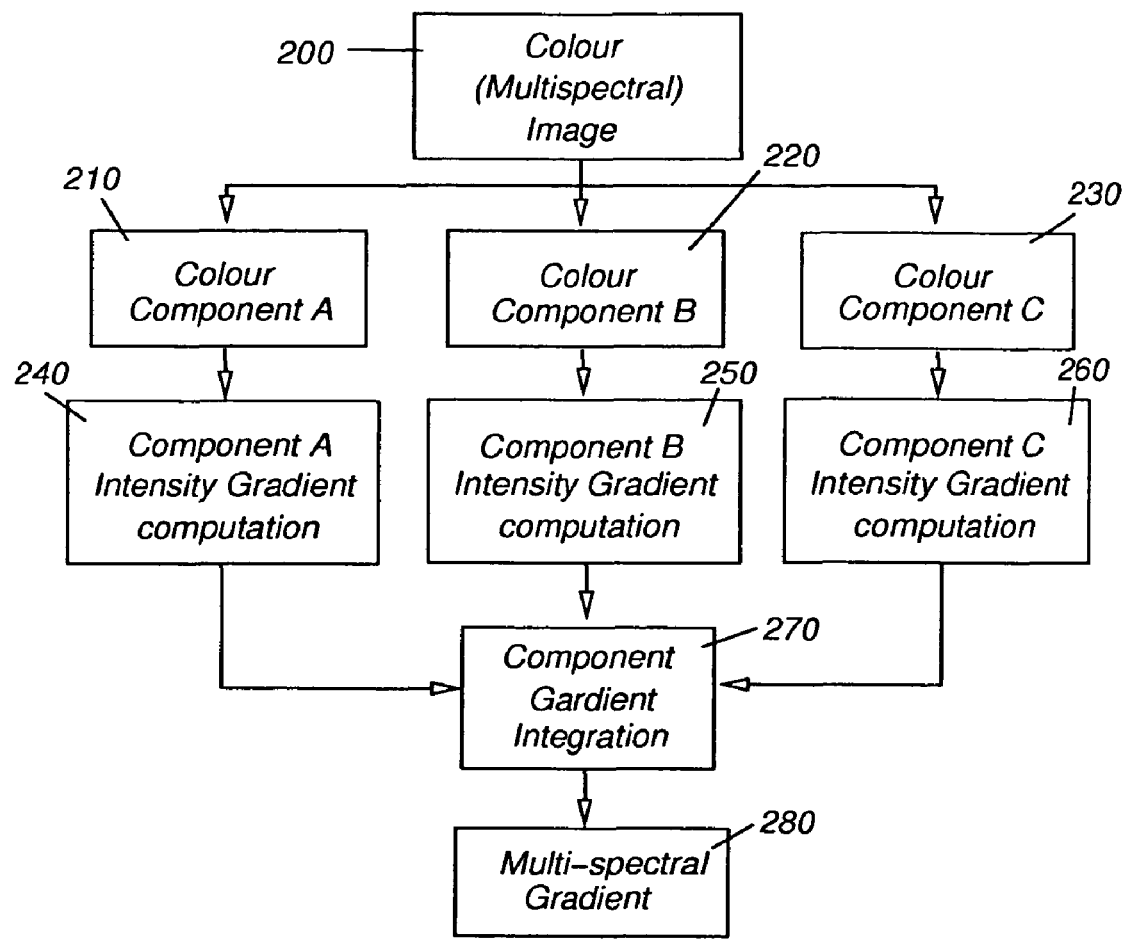
FIG. 6 is a diagram of a system according to an embodiment of the inventions.

In the first approach, the intensity gradient computation unit 110 is replaced with multi-spectral unit shown in FIG. 6. This Figure shows an example of gradient computation for a multi-spectral image with 3 components: A, B, and C. The components could be R,G,B colour components, or Y, U, V colour components, or any other suitable colour space could be used. In the first step, the image is separated into band components 210,220 and 230, and the gradient magnitude is computed in each band separately by units 240, 250, 260. The component gradient magnitudes are then combined in the component gradient integration unit 270. A good way of combining the gradient magnitude components is a weighted averaging, where components magnitudes are summed up after multiplication by suitable weights. The multi-spectral gradient obtained, 280, is then used as input to image subdivision unit 130 and processed in the same way as previously described. When a search object example is presented to the system, an identical approach to gradient combination as used when extracting the descriptors from the database images is employed. Once gradients are combined, an identical approach is used to extract the descriptor as given in the example previously.

Figure 7:
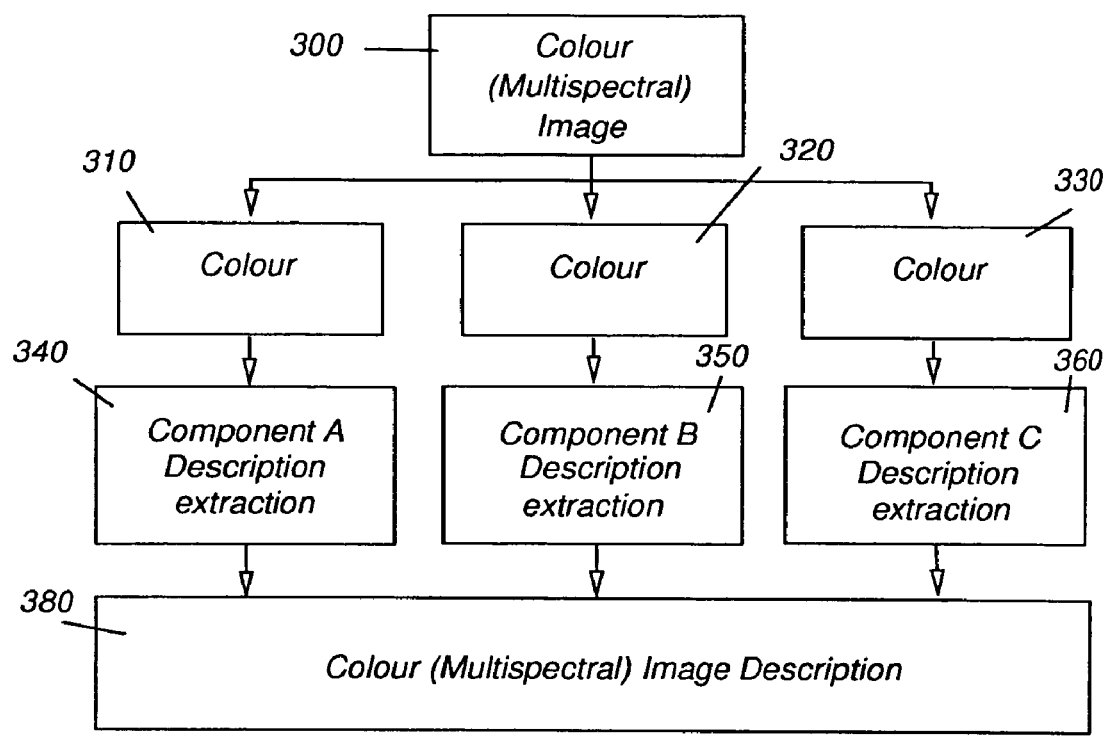
FIG. 7 is a diagram of a system according to another embodiment of the invention.

In the second approach, the descriptor is extracted and stored for each image band separately, as shown on FIG. 7. The input image 300 is separated into component bands 310, 320, 330, and the description is extracted for each band independently in the modules 340, 350, 360, as described previously. All component descriptions are stored. The description for the search-example object is extracted in an analogous way, i.e. separate descriptors for each band are computed. The matching of descriptors can be performed in each band separately and the matching scores combined, e.g. by weighted averaging. Alternatively, a search may be performed based solely on a single band, or subset, of bands. It can be seen that the second approach is more flexible, however at the expense of more storage requirements.

After a matching procedure, the results may be ordered on the basis of similarity, or compared with a threshold, etc, and the results may be displayed.

In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

The image may be a grayscale or colour image, or another type of multi-spectral image, for example, IR, UV or other electromagnetic image, or an acoustic image etc.

The invention can be implemented for example in a computer system, with suitable software and/or hardware modifications. Aspects of the invention can be provided in software and/or hardware form, or in an application-specific apparatus or application-specific modules can be provided, such as chips. Components of a system in an apparatus according to an embodiment of the invention may be provided remotely from other components. For example, the invention could be implemented in the form of a searching engine involving a database storing images and related descriptors, where queries are input remotely, for example, over the internet. The descriptors and the images to which they relate may be stored separately.

The described embodiments involve producing a gradient image of an image, and deriving a descriptor of one or more regions of the gradient image. Instead of the gradient image, other techniques which highlight edges in an image may be used.

The embodiments use moments-based techniques to derive descriptors of the regions of the image. However, other techniques can be used, especially if they involve spatial integration of each region (eg summing, weighted summing etc), and/or if the resulting representation/descriptor of the region is rotationally invariant.

The invention claimed is:

1. A method of representing an image, the method comprising:
   processing a first image to be represented to produce a second image highlighting edges in the first image without segmenting the first image;
   computationally sub-dividing the second image into a plurality of regions; and computationally deriving an image descriptor for each of the plurality of regions of the second image, wherein deriving an image descriptor for a region of the second image includes deriving, using a computing device, an image descriptor which is substantially rotationally invariant without segmenting the region into object and background aspects.

2. A method as claimed in claim 1 further comprising combining or associating image descriptors for the regions to produce an image descriptor for the first image.

3. A method as claimed in claim 1 wherein at least two of the regions overlap.

4. A method as claimed in claim 2 wherein at least one of the regions is substantially rotationally symmetric.

5. A method as claimed in claim 4 wherein the at least one rotationally symmetric region comprises a circle or any regular polygon having an even number of sides.

6. A method as claimed in claim 1 further comprising deriving the image descriptor for a region of the second image by spatially integrating pixel values of the region of the second image.

7. A method as claimed in claim 2 wherein the regions are unrelated to image content.

8. A method as claimed in claim 1, wherein deriving an image descriptor which is substantially rotationally invariant comprises analyzing the region with a moments-based technique to derive regional moments.

9. A method as claimed in claim 8 wherein the moments-based technique comprises deriving Zernike moments or Angular Radial Transform (ART) moments.

10. A method as claimed in claim 8 further comprising using a subset of the derived moments to derive the substantially rotationally invariant image descriptor.

11. A method as claimed in claim 1 wherein processing a first image to produce a second image comprises producing a gradient image.

12. A method as claimed in claim 1 wherein the first image is a grayscale image and the second image is an intensity gradient image.

13. A method as claimed in claim 1 wherein the first image is a multi-spectral image, wherein a second image, comprising a gradient image, is produced for each of one or more spectral components of the first image.

14. A method as claimed in claim 13 wherein gradient values for each spectral component of a pixel are combined, for example, by summing, averaging, or weighted averaging.

15. A computer-readable medium having embodied thereon a computationally derived image descriptor for computer-aided search and reference of an image, wherein the image descriptor is produced by the method of claim 2.

16. A computer program stored on a non-transitory computer-readable medium for executing method of representing an image, the method comprising:
processing a first image to be represented to produce a second image highlighting edges in the first image without segmenting the first image;
computationally sub-dividing the second image into a plurality of regions; and
computationally deriving an image descriptor for each of the plurality of regions of the second image, wherein deriving an image descriptor for a region of the second image comprises deriving an image descriptor which is substantially rotationally invariant without segmenting the region into object and background aspects.

17. An apparatus for creating a representation of an image, the apparatus comprising:
a first image processing unit that processes a first image to be presented, thereby producing a second image highlighting edges in the first image without segmenting the first image;
a regional extraction unit that divides the second image into a plurality of regions;
a regional image descriptor derivation unit that computationally derives an image descriptor for each of said plurality of regions of the second image by deriving a rotationally invariant feature vector for the region without segmenting the region into object and background aspects; and
an image descriptor generator that turns the regional image descriptors into an overall image descriptor for the first image.

18. The method of claim 5, further comprising dividing the second image into a plurality of regions.

* * * * *